United States Patent [19]

Gross et al.

[11] Patent Number: 5,338,087

[45] Date of Patent: Aug. 16, 1994

[54] ANTI-SQUEAK MOLDING

[75] Inventors: Michael G. Gross, Tipp City; Jack D. Young, Huber Heights, both of Ohio

[73] Assignee: Creative Extruded Products, Inc., Tipp City, Ohio

[21] Appl. No.: 78,466

[22] Filed: Jun. 21, 1993

Related U.S. Application Data

[63] Continuation-in-part of Ser. No. 36,213, Mar. 24, 1993, abandoned.

[51] Int. Cl.⁵ ............................................. B60J 10/02
[52] U.S. Cl. ................................ 296/146.15; 296/93; 52/397; 52/717.04; 428/122
[58] Field of Search .............. 296/93, 146.15; 52/208, 52/397, 400, 403, 716.5, 716.8, 717.03, 717.04, 717.05; 428/122

[56] References Cited

U.S. PATENT DOCUMENTS

| | | | |
|---|---|---|---|
| 3,879,241 | 4/1975 | Butler | 296/93 X |
| 4,546,986 | 10/1985 | Roselli | 296/93 X |
| 4,765,673 | 8/1988 | Frabotta et al. | 296/93 |
| 4,813,733 | 3/1989 | Gustafson et al. | 296/93 |
| 4,950,019 | 8/1990 | Gross | 296/93 |
| 4,953,907 | 9/1990 | Sugita | 296/93 |
| 4,980,218 | 12/1990 | Nakamura et al. | 296/93 X |
| 5,044,684 | 9/1991 | Yada | 296/93 |
| 5,245,808 | 9/1993 | Grunewald et al. | 52/400 X |
| 5,255,483 | 10/1993 | Agrawal et al. | 296/93 X |

FOREIGN PATENT DOCUMENTS 249560 12/1987 European Pat. Off. .
2565621 12/1985 France .................. 296/93

Primary Examiner—Johnny D. Cherry
Assistant Examiner—Andrew C. Pike
Attorney, Agent, or Firm—Reuben Wolk

[57] ABSTRACT

A decorative molding is used as a seal around a fixed automobile window, for the purpose of eliminating the squeak caused by rubbing of the molding against the adjacent body during driving. The molding is monolithic and is primarily composed of a flexible elastomeric material such as polyvinyl chloride, co-extruded with a melt-processible rubber that forms an inner body-contacting anti-squeak layer. Optionally, an outer decorative layer of high gloss or colored elastomeric material may be tri-extruded as part of the molding. In a modified form of the invention, flexible members extend from either or both of the window contacting portions of the molding and contact the glass surfaces to improve the gripping thereof.

13 Claims, 1 Drawing Sheet

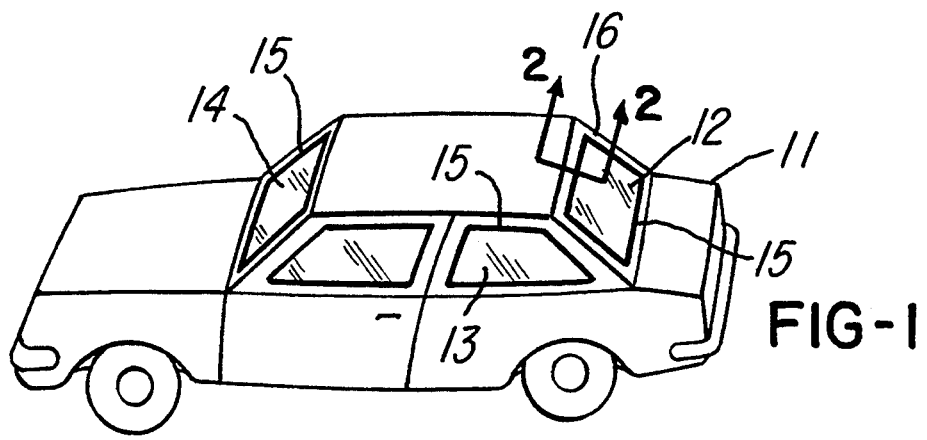
FIG-1
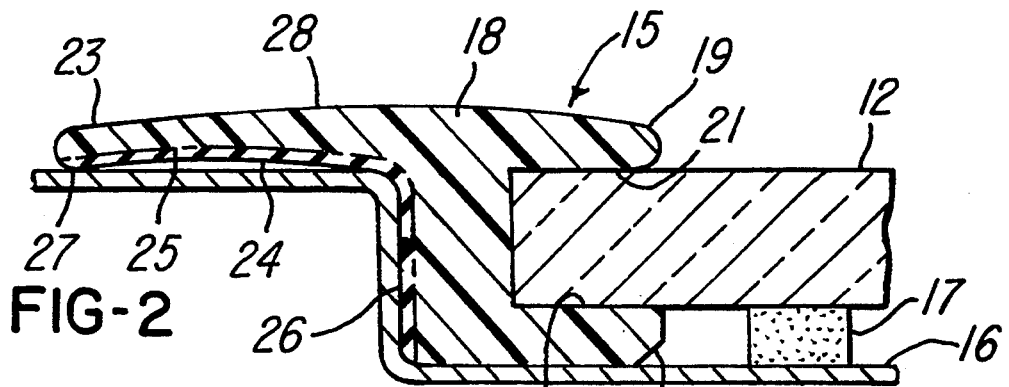
FIG-2
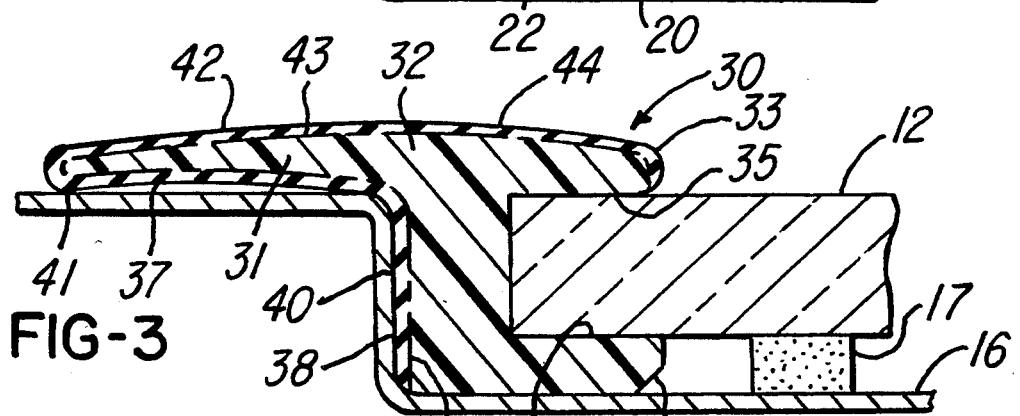
FIG-3
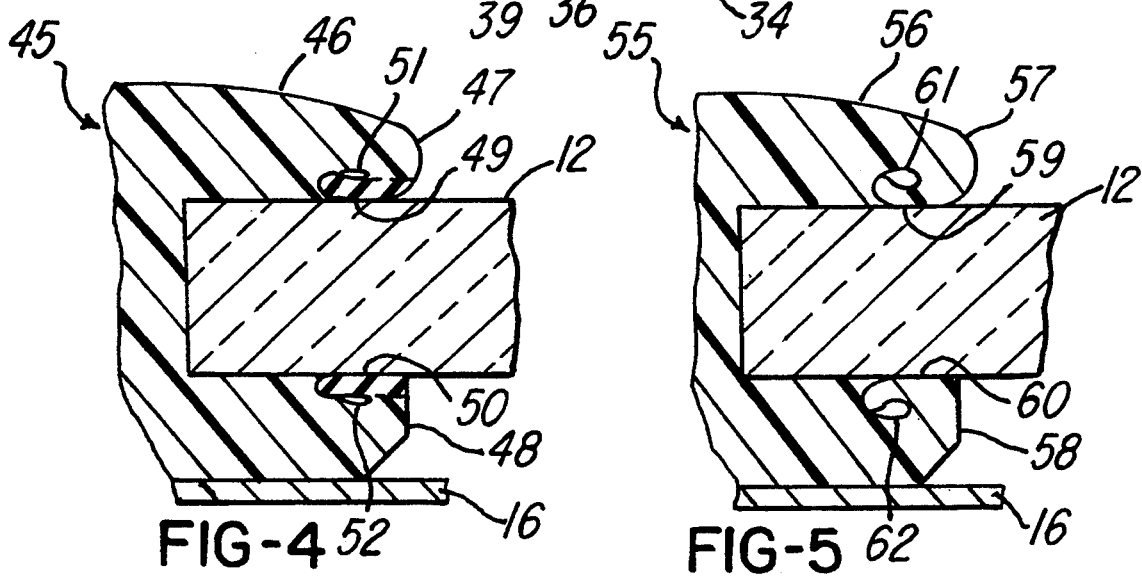
FIG-4
FIG-5

ANTI-SQUEAK MOLDING

CROSS REFERENCE TO RELATED APPLICATION

This application is a continuation-in-part application of its copending parent U.S. patent application Ser. No. 08/036,213, filed Mar. 24, 1993 now abandoned.

BACKGROUND OF THE INVENTION

The present invention relates to a decorative molding for automobiles, particularly to the application of a molding to a fixed window such as the rear window, the body mounted rear side windows, or portions of the windshield. The molding is used to retain the window and to conceal the space between the edge of the window and the adjacent body panel. Conventional moldings tend to rub against the body portion when the auto is moving, emitting undesirable squeaking noises (also known as "itching"), which may at times even be audible within the automobile. The rubbing action may also chafe the paint on the body surface, leading to corrosion.

PRIOR ART STATEMENT

The squeaking or itching referred to above is common in the moldings presently in commercial use. This is because these moldings are usually made of an elastomer that slides or rubs across the adjacent body portion. Typical moldings are shown in Gross, U.S. Pat. No. 4,950,019 (of common assignment); Gustafson U.S. Pat. No. 4,813,733; French Patent No. 2,565,621; and European Patent Application No. 249560.

SUMMARY OF THE INVENTION

The improved decorative molding of the present invention solves the squeaking problem by forming a monolithic molding of a multi-extruded elastomeric material, having a principal elastomeric member and an inner body-contacting layer formed of a melt-processible rubber material. This inner layer eliminates the squeak because it has superior gripping properties, and hence does not skid or slip across the metal body surfaces as do conventional polyvinyl chloride moldings. In addition, this layer cooperates with the stiffer body member to achieve this result. The novel molding may also have an outer exposed decorative surface layer made of a high gloss or colored elastomer, which is also co-extruded.

A variation in the novel molding provides for a separate flexible finger-like extension on one surface of the glass-gripping segment, which eliminates the use of conventional adhesive materials such as butyl rubber. These extensions may be on either or both of the segments.

Accordingly it is a principal object of the invention to provide a decorative molding for an automobile for concealing the space between a fixed window and an adjacent body portion, having a layer contacting the body portion which eliminates the squeaking noises generated by rubbing the molding across the body portion.

It is a further object to provide an additional decorative outer exposed surface on said molding.

It is another object to co-extrude said layers within sale molding in a simple and inexpensive manner.

It is still another object to provide flexible members on the glass gripping segments to improve the gripping effect. Other features and objects of the invention will become apparent from the embodiments set forth in the following description and drawings.

DESCRIPTION OF THE DRAWINGS

FIG. 1 is a perspective view of a typical automobile illustrating various locations of the novel molding;

FIG. 2 is an enlarged section taken along the lines 2—2 of FIG. 1;

FIG. 3 is a view similar to FIG. 2 illustrating another form of invention;

FIG. 4 is a partial view of a molding similar to that of FIG. 2, illustrating an optional feature;

FIG. 5 is a view similar to FIG. 4 illustrating a variation of FIG. 4.

DESCRIPTION OF THE PREFERRED EMBODIMENT

Referring to the drawings, the automobile 11 of FIG. 1 contains, among other parts, a rear window 12, fixed side windows 13, and a windshield 14. The novel molding 15 is fabricated as a continuous strip for use around the entire rear and side windows, and on the upper and side portions of the windshield. As shown in FIG. 2 the glass window 12, for example, is attached to the adjacent body panel 16 by means of an adhesive 17. The molding 15 comprises a principal member 18 composed of an elastomeric material such as polyvinyl chloride having a hardness of about 80 to 90 Shore A. This material is of the type commonly used in the industry, and may contain filler material. The member 18 is located between the body panel and the adjacent edge of the window 12. The principal member has an outer portion 28 for concealing the space between the body panel and the window edge, this portion having a first segment or leg 19 contacting the upper surface of the window edge. Extending from the principal member is a second segment or leg 20 which contacts the lower surface of the window edge. The two segments thus cooperate to grip and retain the window edge. The outer portion has a tip segment 23 opposite the segment 19, this segment having an inner surface 27 which contacts the body panel, while the principal member has an inner surface also contacting the body panel 16. The outer surface 28 is smooth and continuous and provides a decorative exposed surface. An inner layer 24 forms the inner portion of the principal member and of the tip segment, this layer being co-extruded with the principal member so that it becomes unitary after extrusion, thus forming a monolithic molding. The juncture of the principal member and the inner layer is shown in dash lines designated by reference number 25. The inner layer thus extends along the body panel-contacting surface of the principal member and the outer portion.

The inner layer 24, which is approximately 0.5 mm thick, is composed of a different material, known as a melt-processible rubber, sold under various trademarks such as ALCRYN (Dupont), and generally defined as a halogenated ethylene interpolymer alloy. This material is somewhat softer than the material forming the principal member, having a hardness of about 65 to 70 Shore A, and provides an added gripping effect against the body panel wherever contacted, such as the edge surface 26 and the inner surface 27 of the tip segment. The melt-processible rubber which composes the inner layer 24 is an elastomeric alloy having the properties of rubber, but is thermoplastic rather than thermosetting, and thus lends itself to the extrusion process. It is also receptive to the use of fillers, thus reducing the cost, yet has a low flexural modulus, good tensile set, and excellent resistance to heat, weathering, oil, fuel, and chemicals, thus making it ideal for the present purposes. The inner surface 26 and the tip surface 27 contact the body panel 16 and eliminate the squeak because these surfaces do not skid or slip across the panel as other materials would. The layer 24 cooperates with the principal member 18, which is somewhat stiffer, and provides the unexpected result of a molding which eliminates squeak.

FIG. 3 illustrates a modified form of the invention in which a molding 30 has a principal member 32 made of the same material as member 18, and includes an outer portion 31. Upper and lower legs 33 and 34 grip and retain the edge of the window 12 by clamping it between surfaces 35 and 36. Opposite the upper leg 33 the outer portion 31 has a tip segment 37 whose inner surface 41 contacts the body panel 16, the outer surface 44 thus being smooth and continuous to provide a decorative surface, and cooperating with leg 33 and tip segment 37 to conceal the space between the edge of the window and the body panel. An inner layer 38, made of the same material as inner layer 24, is formed along the body panel-contacting surfaces, the inner surface 40 and inner surface 41 making the actual contact in the manner described with respect to molding 15. Thus far, the molding 30 is identical to molding 15; however, an additional decorative effect is provided by an outer layer 42, approximately 0.5 mm thick. This is made of an elastomer similar to that of the principal member, namely polyvinyl chloride or the like, except that it may have a higher gloss or be colored to provide a decorative surface 44. This molding is formed as a tri-extrusion comprising the principal member 32 and layers 38 and 42, and also becomes unitary after extrusion to form a monolithic molding. The junctures of these layers is shown by dash lines designated by reference numbers 39 and 43. The completed molding 30 is fully interchangeable with molding 15 and provides the same anti-squeak properties, the only difference being the outer appearance.

FIG. 4 is an enlarged partial showing of a modification which is applicable to the molding of either FIG. 2 or FIG. 3. The molding designated by reference number 45 comprises a principal member 46 formed of the same material as principal members 18 and 32, and has an inner layer (not shown) formed of the same melt-processible rubber as layers 24 and 38. The member 46 has legs 47 and 48 whose surfaces would normally grip the edge of window 12; in FIG. 2 these surfaces are designated as 21 and 22, and in FIG. 3 are designated as 35 and 36. It is conventional to provide a hot melt butyl material on these surfaces to enhance the gripping effect of the legs on the glass; however, in this modified form of the molding, flexible members referred to as fingers 49 and 50 extend from the ends of the legs 47 and 48, these fingers being made of the same melt-processible rubber as the layers 29 and 38. These fingers provide the desired gripping effect, and at the same time also serve to eliminate undesirable squeaking noises between the legs and the window. The fingers are formed by co-extruding them with the other parts of the molding. When the legs 47 and 48 are placed around the edge of the window, the fingers are squeezed between each leg and its adjacent window surface to form a tight contact between the legs and the glass, thus providing a tight grip upon the glass, and forming the gaps 51 and 52 between the fingers and the legs. The grip is the result of the combination of the non-skid properties of the material and the squeezing effect of the fingers. Although FIG. 4 illustrates fingers on both the upper and lower legs, certain of the designs may utilize only the upper finger 49 or the lower finger 50, with the other leg being of the normal configuration shown in FIGS. 2 or 3.

FIG. 5 represents a further modification of the invention, also applicable to the molding 15 or the molding 30. This form of the molding is designated by reference number 55 which is similar to molding 45 of FIG. 4. The molding 55 comprises a principal member 56, formed of the same material as principal members 18, 32, and 46, and has an inner layer (not shown) of the same melt-processible rubber as layers 24 and 38. The member 56 has legs 57 and 58 whose surfaces would normally grip the edge of the window, designated as 21, 22, 35, and 36 in FIGS. 2 and 3, and also has flexible members referred to as fingers 59 and 60 which extend from the ends of legs 57 and 58. To this point, the molding 55 is identical to molding 45; however, the fingers 59 and 60 are made of the same material as the principal member 56, in contrast to the use of the melt-processible rubber of fingers 49 and 50. As in the FIG. 4 modification, the fingers 59 and 60 are squeezed between the legs 57 and 58 to form a tight contact and grip upon the glass 12, forming gaps 61 and 62 between the fingers and legs. Although the non-skid properties of melt-processible rubber are not present, the squeezing effect of the fingers still provides a secure grip upon the glass. It should be noted that although FIG. 5 illustrates fingers on both upper and lower legs, either the finger 59 or finger 60 may be utilized, with the other finger having the normal form shown in FIG. 2 or FIG. 3.

It should be noted that all references to "upper" and "lower" in the foregoing description are in relation tot he showings in the drawings; however, the moldings may be oriented in accordance with the requirements of the specific installation.

The above embodiments are exemplary, but other modifications may be made within the spirit of the invention.

We claim:

1. In an automobile having a body panel and an adjacent fixed window having a space therebetween, an elastomeric molding comprising a principal member between said body panel and an edge of said window, said molding including an outer portion for concealing said space and having a first segment, said principal member having a second segment extending therefrom and cooperating with said first segment to retain said window edge, said principal member and said outer portion having surfaces contacting said body panel; the improvement wherein said principal member is composed of a first elastomeric material, said molding further comprising a layer of melt-processible rubber extending along said body panel-contacting surfaces of said principal member and said outer portion, said layer eliminating undesirable squeaking noises between said layer and said body panel, at least one of said segments including a flexible member contacting a surface of said window edge to enhance the retention thereof and to eliminate undesirable squeaking noises between said segment and said window edge, wherein said flexible member is squeezed between said segment and said surface of said window edge.

2. The molding of claim 1 wherein said layer has a thickness of approximately 0.5 millimeters.

3. The molding of claim 1 wherein aid principal member and said layer are co-extruded to form a unitary elastomeric molding.

4. The molding of claim 1 wherein said principal member has a hardness of approximately 80 to 90 Shore A.

5. The molding of claim 1 further comprising a decorative outer layer on said outer portion, said layer being composed of an elastomeric material dissimilar from the material of the remainder of said outer portion, said body and said layers being co-extruded to form a unitary molding.

6. The molding of claim 5 wherein said outer layer is a high gloss decorative material.

7. The molding of claim 5 wherein said outer layer is a colored decorative material.

8. The molding of claim 1 wherein said flexible member is composed of melt-processible rubber.

9. The molding of claim 1 wherein said flexible member is composed of said first elastomeric material.

10. The molding of claim 1 wherein said flexible member is co-extruded with said principal member and said layer.

11. The molding of claim 1 including a plurality of flexible members which are formed as part of both of said first and second segments.

12. The molding of claim 11 wherein said flexible members are composed of said first elastomeric material.

13. The molding of claim 11 wherein said flexible members are composed of melt-processible rubber.

* * * * *